(12) United States Patent
Wang et al.

(10) Patent No.: US 12,487,688 B1
(45) Date of Patent: Dec. 2, 2025

(54) TOUCH CONTROLLER SYNCHRONIZATION WITH THE DOWNLINK SIGNAL OF STYLUS

(71) Applicant: STMicroelectronics International N.V., Geneva (CH)

(72) Inventors: Pan Wang, Shenzhen (CN); Yue Ding, Beijing (CN); Bowei Chen, Shenzhen (CN)

( * ) Notice: Subject to any disclaimer, the term of this patent is extended or adjusted under 35 U.S.C. 154(b) by 0 days.

(21) Appl. No.: 18/912,833

(22) Filed: Oct. 11, 2024

(51) Int. Cl.
*G06F 3/0354* (2013.01)

(52) U.S. Cl.
CPC .............................. *G06F 3/03545* (2013.01)

(58) Field of Classification Search
CPC . G06F 3/03545; G06F 3/04162; G06F 3/0383
See application file for complete search history.

(56) References Cited

U.S. PATENT DOCUMENTS

| 11,556,209 | B2 * | 1/2023 | Park .................... G06F 3/04162 |
| 11,698,690 | B1 | 7/2023 | Hung |
| 2019/0004664 | A1 * | 1/2019 | Zyskind ................ G06F 3/0442 |
| 2022/0019331 | A1 | 1/2022 | Park |
| 2022/0326805 | A1 * | 10/2022 | Lin ...................... G06F 3/03545 |
| 2022/0334701 | A1 | 10/2022 | Cheng |
| 2022/0365610 | A1 | 11/2022 | Miyamoto |

FOREIGN PATENT DOCUMENTS

CN 117784957 A 3/2024

\* cited by examiner

*Primary Examiner* — Temesghen Ghebretinsae
*Assistant Examiner* — Ivelisse Martinez Quiles
(74) *Attorney, Agent, or Firm* — Slater Matsil, LLP

(57) ABSTRACT

According to an embodiment, a system for synchronizing a stylus-enabled device with a stylus is proposed. The stylus-enabled device includes a touch controller configured to transmit an uplink signal to the stylus, receive a downlink signal from the stylus, determine a timing offset between the uplink signal and the downlink signal, determine a phase shift of the downlink signal, and adjust a synchronization timing based on the determined timing offset and the determined phase shift.

20 Claims, 7 Drawing Sheets

TOUCH CONTROLLER SYNCHRONIZATION WITH THE DOWNLINK SIGNAL OF STYLUS

TECHNICAL FIELD

The present disclosure generally relates to electronic devices and, in particular embodiments, to a touch controller synchronization with the downlink signal of a stylus.

BACKGROUND

Stylus-enabled devices have become ubiquitous in modern technology, spanning from smartphones and tablets to digital drawing pads and interactive displays. These devices rely on sophisticated touch-sensing technologies to interpret user inputs accurately, whether from fingertips or styluses. The ability to precisely detect and track touch inputs is central to providing a seamless and responsive user experience.

Maintaining accurate synchronization between the stylus and the touch controller is a principal component of the interaction process. The synchronization involves an interplay of signals between the stylus and the touch-sensing surface. Typically, this communication occurs through uplink and downlink signals. The uplink signal is transmitted from the touch controller to the stylus, often carrying timing and configuration information. Conversely, the downlink signal is sent from the stylus to the touch controller, usually containing position and pressure data. The precision of the two-way communication impacts the accuracy of stylus tracking, the responsiveness of the device, and, ultimately, the quality of the user experience. However, the delicate system can be susceptible to various forms of interference, including electromagnetic noise from nearby electronic devices or environmental factors, disrupting the synchronization process and leading to performance issues.

SUMMARY

Technical advantages are generally achieved by embodiments of this disclosure, which describe a touch controller synchronization with the downlink signal of a stylus.

A first aspect relates to a system for synchronizing a stylus-enabled device with a stylus, the stylus-enabled device comprising a touch controller configured to transmit an uplink signal to the stylus; receive a downlink signal from the stylus; determine a timing offset between the uplink signal and the downlink signal; determine a phase shift of the downlink signal; and adjust a synchronization timing based on the determined timing offset and the determined phase shift.

A second aspect relates to a method for synchronizing a stylus-enabled device with a stylus, the method comprising transmitting, by a touch controller of the stylus-enabled device, an uplink signal to the stylus; receiving, by the touch controller, a downlink signal from the stylus; determining a timing offset between the uplink signal and the downlink signal; determining a phase shift of the downlink signal; and adjusting a synchronization timing based on the determined timing offset and the determined phase shift.

A third aspect relates to a touch controller for synchronizing a synchronizing a stylus-enabled device with a stylus, the touch controller comprising an analog-to-digital converter (ADC) configured to sample a downlink signal received from the stylus; an In-phase and Quadrature (I/Q) demodulator configured to extract magnitude and phase information from the sampled downlink signal; a processor configured to determine a timing offset between an uplink signal transmitted to the stylus and the downlink signal, determine a phase shift of the downlink signal based on the extracted phase information, and adjust a synchronization timing based on the determined timing offset and the determined phase shift; and a timing generator circuit configured to apply the adjusted synchronization timing to subsequent communications with the stylus.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
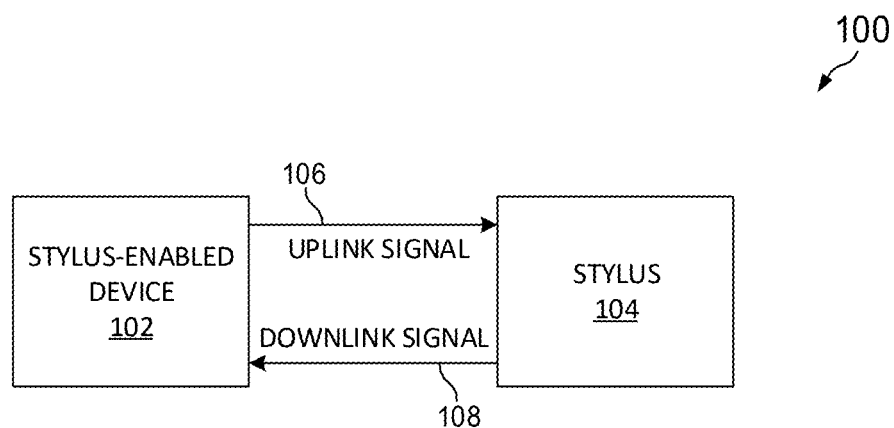
FIG. 1 is a simplified block diagram of an embodiment system.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of tablet computers and smartphones with active stylus input, it should also be appreciated that these inventive aspects may also apply to a wide range of touch-sensitive devices and stylus technologies. In particular, aspects of this disclosure may similarly apply to digital drawing pads, interactive whiteboards, point-of-sale signature capture devices, and medical imaging equipment utilizing stylus input for precise annotations. The synchronization techniques described could also be adapted for use in virtual reality controllers, augmented reality glasses with stylus interaction, and even non-display applications such as high-precision industrial measurement tools using stylus-like probes.

Aspects of this disclosure address a challenge in stylus-touch controller synchronization, particularly in scenarios where external interference disrupts the normal communication flow. In embodiments, a proposed approach aims to maintain synchronization when the stylus fails to receive the uplink signal from the touch controller.

In embodiments, the stylus continuously transmits downlink signals, regardless of whether it successfully receives the uplink signal. The persistent downlink transmission can serve as a failsafe mechanism, ensuring the touch controller has a constant data stream for synchronization. To complement this, the touch controller has advanced signal processing capabilities to effectively detect and analyze these downlink signals.

In embodiments, the touch controller employs an In-phase and Quadrature (IQ) demodulator. The I/Q demodulator enables the controller to extract magnitude and phase information from the incoming downlink signals. The controller's firmware can utilize the data to calculate the timing offset and determine the phase shift between the stylus and controller.

The synchronization process can be refined through a coarse timing adjustment by analyzing sample data fragments of an analog-to-digital converter (ADC). This can provide a rough alignment of the timing between the stylus and the controller. A fine-tuning step can be executed using the phase shift information derived from the IQ demodulator, allowing for precise synchronization adjustments.

Advantageously, the proposed approach enhances the robustness of stylus-touch controller communication. Maintaining synchronization even in less-than-ideal conditions mitigates common issues such as broken lines or non-responsive stylus behavior. The result is a more reliable and consistent user experience across various stylus-enabled devices, from smartphones and tablets to specialized drawing tablets and interactive displays. These and additional details are further detailed below.

FIG. 1 illustrates a simplified block diagram of an embodiment system 100. System 100 includes a stylus-enabled device 102 and a stylus 104, which may (or may not) be arranged as shown. In embodiments, stylus-enabled device 102 is a smartphone, smartwatch, wearable device, tablet, laptop, gaming device, personal computer, or any other stylus-enabled device that includes a grid-type sensor, such as a device with a touchscreen.

The stylus-enabled device 102 can take many forms, each designed to capitalize on pen-based input's precision and intuitive nature. These devices range from tablets and smartphones to specialized graphics tablets and interactive whiteboards. General-purpose and specialized drawing tablets offer digital artists, students, and professionals a portable canvas. Smartphones with stylus support, particularly larger models, bring the power of pen input to an even more compact form factor, enabling note-taking and sketching on the go.

In the realm of productivity, 2-in-1 laptops and convertible devices blur the line between traditional computers and tablets. These devices offer the full functionality of a laptop with the added benefit of a touchscreen that can be used with a stylus, making them ideal for professionals who need typing and handwriting capabilities. For collaborative environments, interactive whiteboards equipped with stylus technology facilitate group discussions, presentations, and brainstorming sessions in educational and corporate settings.

The stylus 104 comes in various forms, each tailored to specific needs and compatible devices. At the simplest level, passive styluses mimic finger touch and require no power or special technology. Moving up in complexity, active styluses contain electronic components that enable advanced features like pressure sensitivity and palm rejection. These styluses often require batteries and may use Bluetooth connectivity to pair with the stylus-enabled device 102, allowing for additional functionality such as programmable buttons or eraser features. Some advanced styluses even incorporate smartpen technology, which can digitize handwriting on paper and transfer it to a digital device.

The applications for the stylus-enabled device 102 and the stylus 104 span various industries and use cases. In the creative field, digital artists and designers rely on the pressure, sensitivity, and precision of styluses to create intricate artwork, illustrations, and graphic designs that rival traditional media. The education sector has embraced stylus technology for digital note-taking, allowing students to handwrite notes, solve equations, and annotate documents with the added benefits of digital organization and searchability.

In professional settings, styluses have become indispensable tools for productivity. They're used for signing digital documents, marking up presentations, and facilitating collaborative brainstorming sessions on digital whiteboards. The medical field has also adopted stylus technology, with healthcare professionals using them to enter patient data, annotate medical images, and even guide certain procedures with high precision.

Engineers and architects leverage stylus input for CAD software for drafting and 3D modeling tasks. In the entertainment industry, animators and video editors use styluses for frame-by-frame animation, rotoscoping, and precise video editing, taking advantage of the natural feel of pen-based input for these detail-oriented tasks.

Stylus technology also affects accessibility, providing individuals with certain motor impairments an easier and more precise way to interact with touch devices than finger touch. Additionally, some mobile and tablet games are specifically designed for stylus input, offering more precise control or mimicking traditional drawing-based games, thus expanding the entertainment possibilities of these devices.

The versatility and precision offered by stylus-enabled device 102 and stylus 104 have made them invaluable tools across a wide range of professional and personal applications. As technology advances, further innovative uses for these devices can be envisioned, enhancing productivity, creativity, and user interaction in the digital realm.

Communication between the stylus-enabled device 102 and the stylus 104 is achieved through an uplink signal 106 and a downlink signal 108. The uplink signal 106, from the stylus-enabled device 102 to the stylus 104, represents the communication initiated by the stylus-enabled device 102. Generally, the stylus-enabled device 102 initiates communication with stylus 104 by transmitting the uplink signal 106. The uplink signal 106 can serve multiple purposes: it can carry timing information, configuration data, and other parameters that the stylus 104 uses to operate in sync with the stylus-enabled device 102.

The uplink signal 106 is created by a touch controller of the stylus-enabled device 102 by modulating a voltage on the x-axis or y-axis sensor electrodes of the touchscreen sensor. Uplink signal 106 acts as a beacon, allowing the stylus 104 to synchronize its operations with the stylus-enabled device 102 and adjust its behavior based on the current state or requirements of the stylus-enabled device 102.

On the other side of the communication channel, the stylus 104 receives the uplink signal 106 and processes the information within it. The stylus 104 responds by transmitting the downlink signal 108 to the stylus-enabled device 102. Typically, the downlink signal 108 is transmitted by dual transmitters (tip and ring) in the stylus 104 that modulate the voltage.

The downlink signal 108 usually contains information such as the stylus's position, pressure applied to the screen, and other data like tilt angle or button states, depending on the stylus 104. The downlink signal 108, from the stylus 104 to the stylus-enabled device 102, represents the response and continuous communication from the stylus 104 back to the stylus-enabled device 102. These voltage modulations couple to the sensor electrodes of the stylus-enabled device 102. The stylus-enabled device 102 uses this information to compute the position of the stylus on the touchscreen and interpret the user's intentions and translate them into actions on the screen, such as drawing a line, selecting an item, or navigating an interface.

The uplink signal 106 and downlink signal 108 are typically modulated signals. Modulation is a process where the information (data) is encoded onto a carrier wave, which is a higher-frequency signal. The carrier wave acts as a vehicle for the information, allowing it to be transmitted more efficiently over the air. Common modulation techniques include amplitude modulation (AM), frequency modulation (FM), or more complex schemes like phase-shift keying (PSK) or quadrature amplitude modulation (QAM).

The choice of communication protocol can vary, with Bluetooth being a popular option due to its widespread adoption and low power consumption. However, other proprietary or standardized protocols may also be used, depending on the manufacturer's specific requirements of the stylus-enabled device 102 and stylus 104. The protocols define how each device packages, transmits, and interprets the data.

The modulation of signals on top of a carrier wave serves several purposes. It allows for efficient use of the electromagnetic spectrum, enables multiple devices to communicate simultaneously without interference (by using different carrier frequencies), and can improve the signal's resistance to noise and interference. The carrier frequency is typically much higher than the data signal frequency, which helps achieve these benefits.

The bidirectional signals enable the real-time, precise input that makes stylus-based interactions feel natural and responsive. The constant exchange of these signals allows for the high accuracy and low latency users expect when using the stylus 104 with the stylus-enabled device 102.

Typically, the continuous exchange of uplink signal 106 and downlink signal 108 occurs rapidly, often many times per second, to ensure real-time responsiveness of the stylus 104 on the touchscreen of the stylus-enabled device 102.

The stylus-enabled device 102 constantly processes the downlink signal 108 from the stylus 104, interpreting the data to reflect the stylus's actions on the touch-sensing layer of the stylus-enabled device 102. Meanwhile, the stylus 104 remains alert for new uplink signals containing updated configuration or timing information.

The efficiency and reliability of the two-way communication system factor into the overall performance of the system 100. Any disruptions or inaccuracies in the communication can lead to lag, misalignment of the stylus input, or complete failure to function properly.

The communication between the stylus-enabled device 102 and the stylus 104 begins with an initial handshake process to establish a connection. The initial step sets the stage for ongoing frame-by-frame communication. However, various factors, such as noise interference, can disrupt the synchronization, leading to communication breakdowns. When synchronization is lost, it can result in visible issues on the display, such as broken lines where the stylus trace fails to register properly.

The typical handshake process begins with the stylus-enabled device 102 broadcasting the uplink signal 106. As the stylus 104 approaches the display layer of the stylus-enabled device 102 and comes within a threshold range, it receives the uplink signal 106, initiating synchronization between the stylus-enabled device 102 and the stylus 104. The synchronization ensures that the stylus-enabled device 102 and the stylus 104 operate on the same timing, allowing the stylus-enabled device 102 to receive and interpret the stylus's information correctly within preset time slots.

Traditionally, the stylus 104 takes charge of the synchronization process. Upon receiving the uplink signal 106 from the stylus-enabled device 102, the stylus 104 attempts to align its timing with the stylus-enabled device 102. However, there are scenarios where the synchronization can fail. For instance, if noise interferes with the uplink signal 106, the stylus 104 may not receive a clear signal. This can lead to a loss of synchronization, preventing the stylus-enabled device 102 from receiving accurate information from the stylus 104.

The uplink signal 106 is typically weaker than the downlink signal 108, with a voltage range of about 3 to 12 volts, usually around 6 volts. In contrast, the downlink signal 108 from the stylus 104 is much stronger, typically between 20 and 80 volts, often around 40 volts. The disparity in signal strength means that in noisy environments, the stylus-enabled device 102 might still receive the downlink signal 108 from the stylus 104, even when the stylus 104 fails to receive the uplink signal 106.

The challenge is further compounded when the stylus 104 is not in direct contact with the stylus-enabled device 102, as the increased distance between the stylus 104 and the stylus-enabled device 102 weakens the signals even more.

To address these issues, embodiments of this disclosure propose an alternative or supplementary approach. Instead of relying solely on the stylus 104 for synchronization, the stylus-enabled device 102 can be configured to perform synchronization using the downlink signal 108 from the stylus 104. The proposed approach ensures that even if the stylus 104 fails to receive the uplink signal 106, synchronization can still be maintained from the stylus-enabled device 102, thereby improving the reliability and consistency of the interaction.

Figure 2:
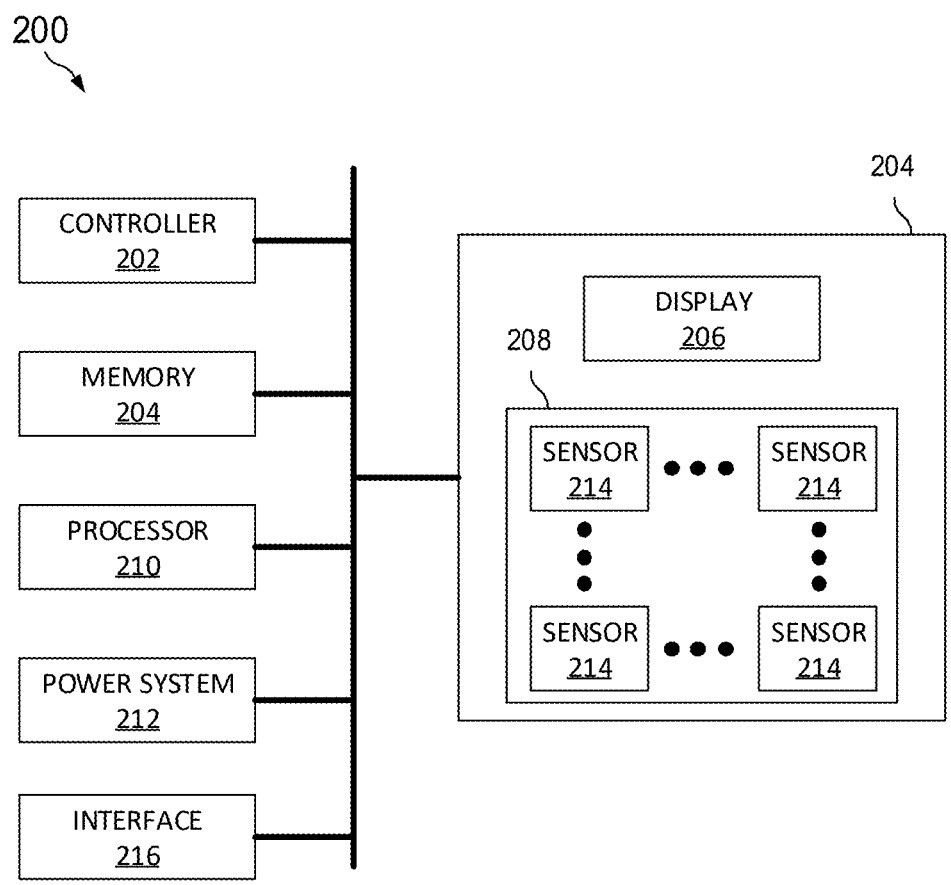
FIG. 2 is a block diagram of an embodiment stylus-enabled device.

FIG. 2 illustrates a block diagram of an embodiment stylus-enabled device 200, which may be implemented as stylus-enabled device 102. Stylus-enabled device 200 includes a touch controller 202, a touchscreen 204, a memory 222, a processor 210, an interface 216, and a power system 220, which may (or may not) be arranged as shown. Stylus-enabled device 200 may include additional components not depicted, such as long-term storage (e.g., non-volatile memory, etc.), additional input and output interfaces, sensors, speakers, or the like.

In embodiments, touch controller 202 is arranged on a System-on-Chip (SoC). Touch controller 202 may be any component or collection of components adapted to perform computations or other signal processing-related tasks. In embodiments, during normal operation, touch controller 202 controls the operation of touchscreen 204. For example, in some embodiments, touch controller 202 receives raw input data from the touchscreen 204 to determine the location and the type of touch. Additionally, touch controller 202 is configured to generate the uplink signal by modulating a voltage on the x-axis or y-axis sensors (i.e., electrodes) of the touch-sensing layer 208.

Processor 210 is configured to operate stylus-enabled device 200. In embodiments, processor 210 is implemented as a general-purpose, custom controller, host processor, or application processor coupled to memory 222 and configured to execute instructions from memory 222 or another memory of stylus-enabled device 200.

In embodiments, processor 210 may be coupled to a second memory of stylus-enabled device 200, which stores the instructions to be executed by processor 210. In some embodiments, touch controller 202 is implemented as part of processor 210. In embodiments, processor 210 is a primary processing unit, and touch controller 202 is an auxiliary processing unit. In embodiments, the touch controller 202 and the processor 210 may be implemented as a single processing unit.

Memory 222 may be any component or collection of components adapted to store programming or instructions for execution by touch controller 202, the processor 210, or both. In an embodiment, memory 222 includes a non-transitory computer-readable medium. In some embodiments, memory 222 is part of processor 210. In some embodiments, memory 222 is external to processor 210, such as inside touch controller 202. Other implementations are also possible. In some embodiments, memory 222 may also store other data types.

Interface 216 may be any component or collection of components that allow stylus-enabled device 200 to communicate with other devices/components or a user. For example, interface 216 may be adapted to receive wireless power from an external source using a transceiver circuit and antennas. Further, interface 216 may include circuitry that allows stylus-enabled device 200 to communicate signals externally or internally within the stylus-enabled device 200, a user, or a stylus.

In embodiments, touchscreen 204 allows users to interact and communicate with the stylus-enabled device 200 using touch or a stylus. In embodiments, touchscreen 204 includes a display layer 206 and a touch-sensing layer 208.

The display layer 206 is configured to display images. In embodiments, a panel driver (not shown) may be coupled to the display layer 206 and the processor 210. The panel driver may be used to drive the display layer 206. The display layer 206 may comprise various technologies, such as a light-emitting diode (LED) display, an organic LED (OLED) display, a liquid crystal display (LCD), or an active-matrix organic LED (AMOLED) display.

The touch-sensing layer 208 can include an array of sensors arranged as a grid (e.g., a touch grid, touch cells, or sensing elements). For example, the touch-sensing layer 208 can include a plurality of sensors 214 arranged in rows and columns. Sensors 214 and the touch-sensing layer 208 may be implemented in any way known in the art. In embodiments, touchscreen 204 is capacitive. The sensors 214 in the touch-sensing layer 208 are capable of detecting the voltage modulations from the stylus 104, which couple to the sensor electrodes.

The touch-sensing layer 208 can register user input via touches made to the surface of the display layer 206. Touch-sensing layer 208 may also be configured to detect input from other inputs, such as a stylus (active or passive) device. In embodiments, the touchscreen 204 may include sensors such as gyroscopes or accelerometers. One or more of these sensors may be integrated.

In embodiments, touchscreen 204 may be configured to receive image data to be displayed on the display layer 206. In various embodiments, touch controller 202 and touch-sensing layer 208 may be configured to operate based on mutual capacitance sensing techniques, self-capacitive sensing techniques, or a combination thereof.

Generally, touchscreen devices, such as stylus-enabled device 200, utilize two sensing methods to detect touch: mutual capacitive and self-capacitive. Mutual capacitive sensing, or mutual sensing data, refers to a touchscreen technology where touch detection is based on measuring the capacitance between two sensors, usually arranged in a grid of rows and columns. In this system, one sensor (the transmitter) emits a signal, and the corresponding change in capacitance is detected by the other sensor (the receiver). When a finger or a stylus approaches or touches the display layer 206, it interferes with the electric field between the sensors of the touch-sensing layer 208, changing the mutual capacitance at that point, which is then detected by the system. For stylus detection, touch controller 202 can use the sensor electrodes to detect the voltage modulations from, for example, the dual transmitters of the stylus 104, which allow for precise position computation.

The primary advantage of mutual capacitive sensing is its ability to accurately detect and track multiple touch points, allowing advanced multi-touch functionalities. Due to its high resolution and precision in detecting touch inputs, which are used in modern touchscreens, it is suitable for applications requiring complex gestures and interactions.

Conversely, self-capacitive sensing, or self-sensing data, involves detecting touch based on the change in capacitance of individual sensors of the touch-sensing layer 208. This method measures the capacitance between each sensor and the ground. When a finger or a stylus is near or touching the display layer 206, it acts as a conductive object, altering the self-capacitance of the sensor in the touch-sensing layer 208, which the system recognizes as a touch.

Self-capacitance faces challenges in distinguishing between multiple simultaneous touches. At the same time, mutual capacitance is better suited for multi-touch detection, as each row and column intersection can be measured independently. However, self-capacitance excels in applications where simple touch interactions are sufficient and cost-effectiveness is a priority. Further, self-capacitance is generally more sensitive to conductive objects and can detect proximity from a greater distance, but it may be more susceptible to noise and interference. While less sensitive than self-capacitance, mutual capacitance is generally more precise and less prone to noise and interference.

Power system 220 provides a power source for the operation and portability of stylus-enabled device 200. Power system 220 may be a power management integrated circuit (PMIC). Power system 220 may include a controller, a battery, a charging circuit, an interface, and other components to allow inductive charging by transferring power from a charging pad or a base station to the stylus-enabled device 200. The power system 220 may be any component or collection of components that manage and control power distribution, conversion, and regulation in the stylus-enabled device 200. In various embodiments, power system 220 is configured to regulate supply voltage to various components of stylus-enabled device 200 and control the charging, discharging, and monitoring of the operations of a battery.

Figure 3:
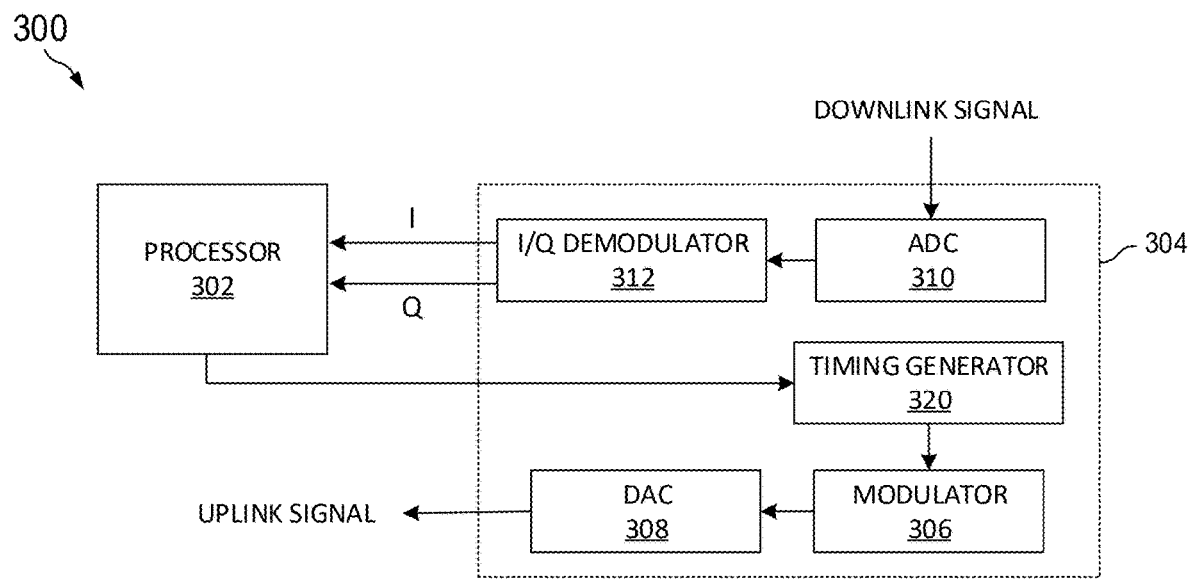
FIG. 3 is a simplified block diagram of an embodiment touch controller.

FIG. 3 illustrates a simplified block diagram of an embodiment touch controller 300, which may be implemented as touch controller 202. Touch controller 300 includes a processor 302 and an analog-front-end (AFE) circuit 304, which may (or may not) be arranged as shown. Touch controller 300 may include additional components not shown, such as a dedicated memory, flash memory, an oscillator, interface circuits, a power management circuit, filters, and amplifiers.

The analog-front-end circuit 304 includes a modulator circuit 306, a digital-to-analog converter (DAC) 308, an analog-to-digital converter (ADC) 310, and an In-phase/Quadrature (I/Q) demodulator circuit 312, which may (or may not) be arranged as shown. Analog-front-end circuit 304 may include additional components not shown, such as input and output amplifiers, filters, and the like.

In embodiments, touch controller 300 is configured to manage the communication between the stylus-enabled device 102 and the stylus 104. It processes the downlink signal 108 from the stylus 104 and generates the uplink signal 106 to maintain synchronization and gather input data. In embodiments, touch controller 300 is configured to modulate the voltage on the x-axis or y-axis sensor electrodes of the touchscreen 204 to communicate the uplink signal 106.

ADC 310 receives the downlink signal and transforms the analog signal into a digital format. The I/Q demodulator circuit 312 is configured to separate the digital signal into two components: the in-phase (I) component, which is in sync with the carrier signal, and the quadrature (Q) component, which is 90 degrees out of phase. By processing the two components, the I/Q demodulator circuit 312 can determine the incoming signal's magnitude (strength) and phase (timing relative to a reference).

The magnitude of the in-phase (I) and quadrature (Q) values are the primary outputs of the I/Q demodulator circuit 312, which are then sent to processor 302 for further analysis and interpretation. In embodiments, the phase and magnitude of the downlink signal can be calculated based on the I and Q values from the I/Q demodulator circuit (e.g., using the Pythagorean theorem). The downlink signal decomposition lets the touch controller 300 extract information about the stylus's position, pressure, and other parameters, enabling highly accurate and responsive stylus tracking.

Processor 302, typically a digital signal processor (DSP), processes the digital signal using digital components to enable complex and precise operations at the stylus-enabled device 102. Processor 302 can perform various complex operations on the digital signal. Processor 302 interprets the stylus data, updates the stylus-enabled device's understanding of the stylus's state and position, and translates this information into actions within the active application (such as drawing a line or selecting an option). Additionally, processor 302 can compute the precise position of the stylus 104 on the touchscreen 204 based on the voltage modulations detected by the sensor electrodes.

For outgoing signals, the process is reversed. Processor 302 generates the appropriate digital signal for communication with stylus 104 for each frame. The timing generator circuit is configured to receive the digital signal and, if applicable, modify the digital signal transmission with the correct timing synchronization (e.g., fixed time for each frame) between the stylus 104 and the stylus-enabled device 102. The modulator circuit 306 imprints the digital information onto a carrier wave suitable for transmission. The modulated digital signal is then converted to an analog form by the DAC 308. The signal is sent out as the touch controller's output, forming the uplink signal 106 to the stylus 104. In embodiments, the uplink signal 106 is transmitted through the x-axis or y-axis sensors electrodes of the touchscreen sensor.

The entire cycle of generating uplink signals and processing downlink signals occurs continuously and at high speeds, enabling real-time interaction between the stylus-enabled device 102 and the stylus 104.

Figure 4:
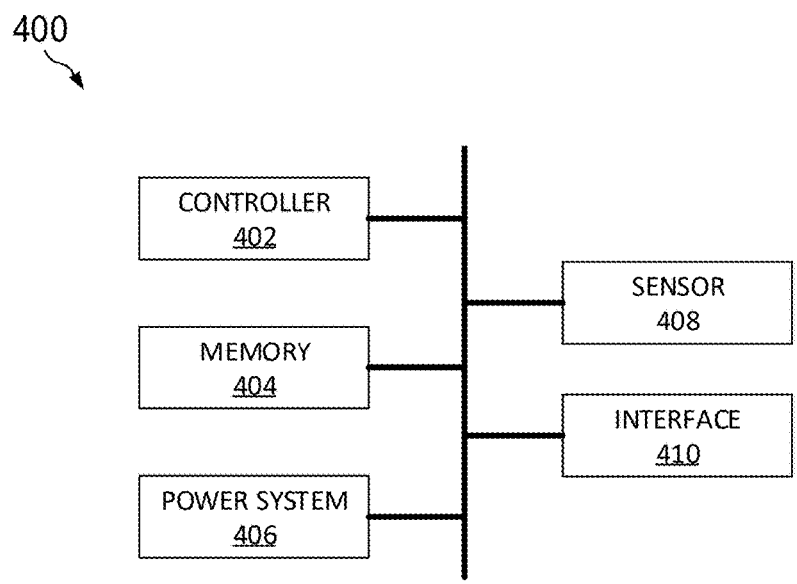
FIG. 4 is a simplified block diagram of an embodiment stylus.

FIG. 4 illustrates a simplified block diagram of an embodiment stylus 400, which may be implemented as stylus 104. Stylus 400 includes a stylus controller 402, a memory 404, a power system 406, a sensor 408, and an interface 410, which may (or may not) be arranged as shown. Stylus 400 may include additional components not shown, such as filters, amplifiers, speakers, or the like.

Stylus controller 402 acts as the central processing unit, coordinating the functions of all other components. It receives the uplink signal 106 through interface 410 and uses memory 404 to store and retrieve necessary data and instructions. Stylus controller 402 may use the processed data to modulate the downlink signal 108 sent to the stylus-enabled device 102, encoding information about the stylus's position, pressure, orientation, and other relevant parameters.

Power system 406 supplies the necessary power to all components, ensuring their continuous operation. It may also communicate with stylus controller 402 to provide information about battery levels or charging status, which could be relayed to the stylus-enabled device 102 or used to manage power-saving modes.

In embodiments, stylus controller 402 is arranged on a System-on-Chip (SoC). In embodiments, stylus controller 402 may be implemented in any way known in the art. In embodiments, stylus controller 402 controls the operation of the stylus 400 during normal operation.

Stylus controller 402 may include an analog-to-digital converter (ADC)—not shown—to convert the analog signals from the stylus-enabled device 200 to digital signals for further processing by stylus controller 402. In embodiments, the ADC may be external to the stylus controller 402. Stylus controller 402 may include a digital-to-analog converter (DAC)—not shown—to convert digital signals to analog signals for transmission to the stylus-enabled device 200. In embodiments, the DAC may be external to the stylus controller 402. Stylus controller 402 may be any component or collection of components adapted to perform computations or other processing-related tasks.

Memory 404 may be any component or collection of components adapted to store programming or instructions for execution by stylus controller 402. In an embodiment, memory 404 includes a non-transitory computer-readable medium. In some embodiments, memory 404 is part of stylus controller 402. Other implementations are also possible. In some embodiments, memory 404 may also store other data types.

Power system 406 provides a power source for the operation and portability of stylus 400. Power system 406 may be a power management integrated circuit (PMIC). Power system 406 may include a dedicated controller, a battery, a charging circuit, a dedicated interface, and other components to allow, for example, inductive charging or wired charging by transferring power from a charging pad or a base station to the stylus 400. The power system 406 may be any component or collection of components that manage and control power distribution, conversion, and regulation in the stylus 400. In various embodiments, power system 406 is configured to regulate supply voltage to various components of stylus 400 and control the charging, discharging, and monitoring of the operations of a battery.

Sensor 408 may include various types of sensors that enhance the functionality and capabilities of the stylus 400. These sensors may include but are not limited to, a gyroscope for detecting orientation and rotational movements, a pressure sensor for measuring the force applied by the stylus tip, and an accelerometer for detecting motion and tilt. The gyroscope can be particularly useful for applications that require precise tracking of the stylus's orientation, such as 3D modeling or digital art. The pressure sensor allows for nuanced input based on how hard the user presses the stylus against the touch surface, enabling features like line thickness variation in drawing applications. The accelerometer can detect rapid movements or gestures made with the stylus, potentially enabling gesture-based commands or interactions.

Additionally, sensor 408 may incorporate other types of sensors depending on the specific requirements of the stylus. These could include a magnetometer for improved position tracking, a temperature sensor to monitor the stylus's operating conditions or even biometric sensors for user identification. The data from these sensors is typically processed by the stylus controller 402, which can then use this information to enhance the accuracy and functionality of the stylus's interactions with the stylus-enabled device.

Interface 410 may be any component or collection of components that allow stylus 400 to communicate with other devices/components or a user. For example, interface 410 may be adapted to receive wireless power from an external source using a transceiver circuit and antennas. Further, interface 410 may include circuitry that allows stylus 400 to communicate signals externally or internally within the stylus 400, a user, or a stylus-enabled device. In embodiments, interface 410 includes dual transmitters located in, for example, the tip and ring of the stylus 400, which are used to transmit the downlink signal 108 by modulating their voltage.

Interface 410 may include antenna(s) and transceiver circuitry for wireless communication, potentially using protocols like Bluetooth or a proprietary wireless standard. Interface 410 is configured to receive the uplink signals from the stylus-enabled device and transmit the downlink signals. In embodiments, the dual transmitters in the tip and ring modulate their voltage to transmit the downlink signal 108, which can be coupled to the sensor electrodes in the stylus-enabled device 102. The uplink signal 106 is processed by the stylus controller 402, which uses the ADC to convert analog signals to digital for processing. They may use a digital-to-analog converter (DAC) to convert digital signals back to analog for transmission.

In the synchronization process between the stylus 400 and stylus-enabled device 102, interface 410, working in conjunction with stylus controller 402, is configured to maintain communication with the stylus-enabled device 102 even when the uplink signal 106 is compromised. The stylus controller 402 can use the data from the sensors 408 and its internal processing to continue sending accurate downlink signals. This allows the stylus-enabled device 102 to maintain synchronization based on the downlink signal 108.

The stylus' communication process, managed by the stylus controller 402, mirrors the stylus-enabled device 102 process but in reverse. Stylus 400 receives the uplink signal 106 from the stylus-enabled device 102 through its interface 410. In embodiments, the received uplink signal 106 may be filtered through a dedicated filtering circuit and amplified before being converted to the digital signal at an ADC. The amplification boosts the signal strength to ensure that the uplink signal 106 is strong enough for accurate demodulation and processing.

Upon reception, the uplink signal 106, an analog signal, is passed through the ADC within or connected to the stylus controller 402. This step converts the continuous analog signal into a discrete digital signal that can be processed by the digital circuitry of the stylus controller 402. The ADC samples the analog signal at a predetermined rate, converting the voltage levels into binary values.

Once digitized, the uplink signal 106 can undergo digital filtration and amplification. For example, digital filters implemented in the controller's firmware can remove unwanted noise and interference that may have been picked up during transmission. The filtering stage enhances the signal quality, improving the accuracy of subsequent processing steps. Digital amplification can boost the signal strength without introducing the noise that can occur with analog amplification.

The digital signal enters the demodulation stage. Here, the stylus controller 402 can employ digital signal processing techniques to separate the information-carrying signal from the carrier wave to isolate the data transmitted from the stylus-enabled device, including timing information, commands, or configuration data.

The stylus controller 402 can process the received information with the demodulated signal. The processing may involve decoding the signal, interpreting commands, updating internal timings, or adjusting stylus parameters based on the received data.

After processing the uplink data, the stylus controller 402 prepares a response as the downlink signal 108. The digital signal is generated based on various inputs, including the processed uplink data, current stylus states (e.g., pressure, tilt, button states), and readings from the sensor 408 (such as accelerometer or gyroscope data).

The digital downlink signal then passes through the DAC to transform the discrete digital signal back into a continuous analog signal suitable for transmission. The conversion is necessary because the physical transmission of the signal requires an analog waveform.

Following the DAC, the analog signal is amplified. This amplification boosts the signal strength to ensure it can be effectively transmitted over the air and received by the stylus-enabled device 102. The level of amplification is controlled to balance signal strength with power consumption and regulatory requirements.

The amplified analog signal enters the modulation stage. Here, the information-bearing signal is superimposed onto a carrier wave. The modulation process allows the signal to be efficiently transmitted through the air.

The modulated signal is sent to the interface 410 for transmission. The interface 410, which may include an antenna and associated circuitry, radiates the signal into the environment. The transmitted downlink signal 108 carries information about the stylus's state and actions back to the stylus-enabled device 102, completing the two-way communication cycle.

The entire process, from receiving the uplink signal 106 to transmitting the downlink signal 108, occurs rapidly and continuously, enabling real-time interaction between the stylus 400 and the stylus-enabled device 102. The efficiency and accuracy of this signal processing chain can be crucial for maintaining precise synchronization and ensuring a responsive user experience.

Figure 5:
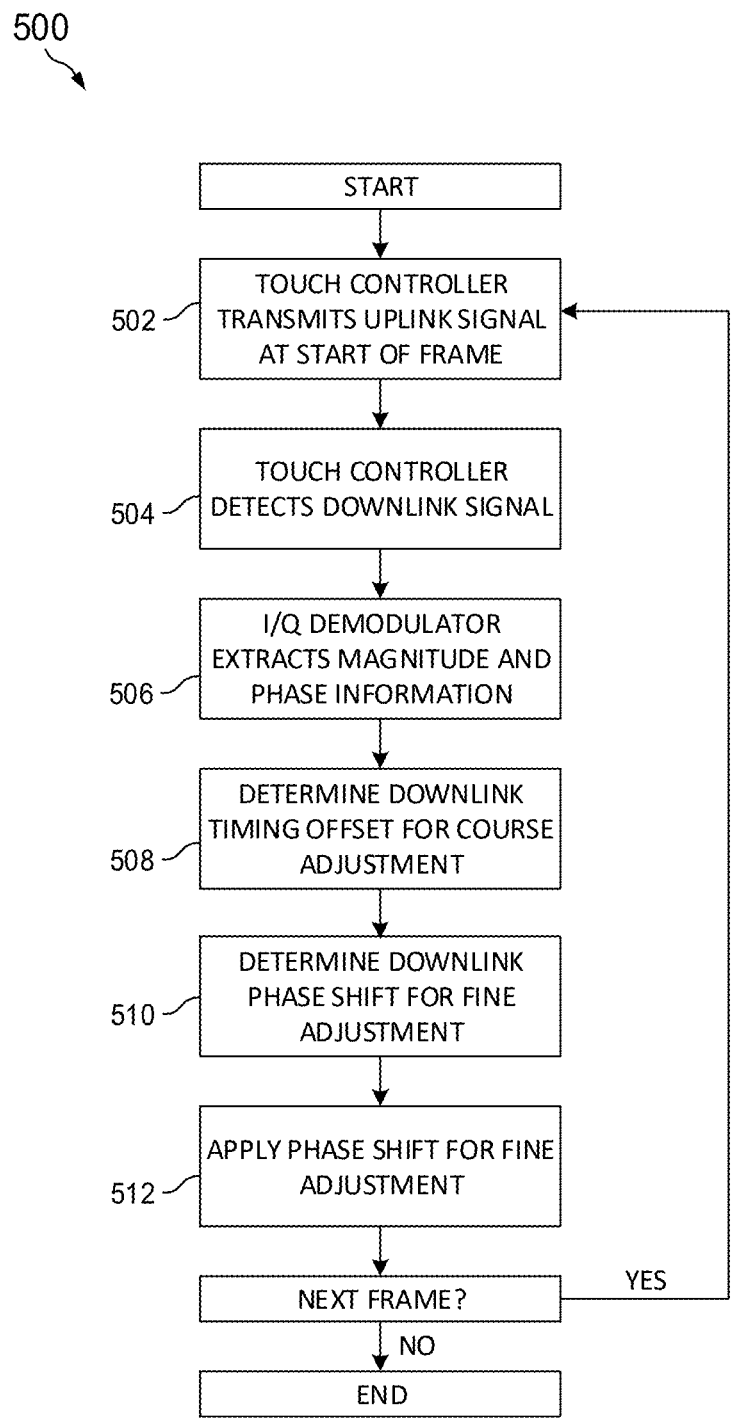
FIG. 5 is a flowchart of an embodiment method for communication between the stylus-enabled device and the stylus.

FIG. 5 illustrates a flowchart of an embodiment method 500 for communication between the stylus-enabled device 102 and the stylus 104. In embodiments, method 500 is implemented within the firmware of a touch controller of the stylus-enabled device 102, such as the touch controller 202 or touch controller 300. In embodiments, method 500 is implemented at the stylus-enabled device 102 to maintain communication with the stylus 104 even if the stylus 104 fails to receive the uplink signal.

It is noted that all steps outlined in the flow chart of method 500 are not necessarily required and can be optional. Further, changes to the arrangement of the steps, removal of one or more steps and path connections, and addition of steps and path connections are similarly contemplated.

At step 502, the touch controller of the stylus-enabled device 102 transmits an uplink signal at the start of each frame. In the first frame, the stylus 104 receives the uplink signal when near the touchscreen of the stylus-enabled device 102. The stylus 104 continues to transmit the downlink signal for a duration, which can be adjusted and configurable, regardless of receiving the uplink signal. The continuous transmission helps avoid issues such as broken lines or other communication problems if the stylus 104 stops transmitting when it doesn't receive the uplink signal. This approach ensures robust communication even in environments with potential interference or signal loss.

At step 504, in the second frame, the touch controller of the stylus-enabled device 102 detects the downlink signal from the stylus 104. The downlink signal is used for timing correction and synchronization between the two devices. The downlink signal is used by the stylus-enabled device 102 to maintain accurate positioning and responsiveness of the input of the stylus 104 on the touchscreen of the stylus-enabled device 102.

At step 506, the touch controller of the stylus-enabled device 102 uses an In-phase and Quadrature (I/Q) demodulator in the demodulator circuit 316 to demodulate the downlink signal. The I/Q demodulator extracts the magnitude and phase information of the downlink signal.

At step 508, the touch controller of the stylus-enabled device 102 determines a downlink timing offset using a detailed segmentation approach. The ADC sampling by the ADC of the touch controller is broken down into many tiny segments. The magnitude is determined for each segment using the information obtained from the I/Q demodulator at step 506.

The segmented magnitude analysis is used to precisely identify the downlink signal's starting and ending timeslots. The timing offset is calculated as the difference between these detected timeslots and when the touch controller is expected to receive the downlink signal. The calculated timing offset using this approach allows for a more accurate coarse timing correction, helping to more closely align the timing of the stylus-enabled device 102 with that of the stylus 104. The high-resolution "mapping" of the downlink signal provided by this segmented approach significantly improves the precision of the synchronization process.

At step 510, the touch controller of the stylus-enabled device 102 determines the downlink phase shift using the phase information obtained from the I/Q demodulator at step 506. The phase information is utilized to calculate the shift between the touch controller's sampling timing and the stylus's actual downlink signal. The phase shift is converted into a corresponding time value. The time value represents a fine-grained adjustment that can be applied to the touch controller's timing, allowing for extremely precise synchronization.

Generally, the downlink signal 108 operates cyclically, with each cycle representing a complete phase rotation from 0 to 359 degrees. When the timing between the stylus-enabled device 102 and stylus 104 is perfectly synchronized, the phase shift directly corresponds to the time shift within a single cycle. For instance, a 90-degree phase shift would equate to a quarter of the cycle's duration in time. This one-to-one relationship between phase and time holds as long as the synchronization remains within one complete cycle.

However, if the synchronization drifts beyond one full cycle (360 degrees), a phenomenon known as phase ambiguity occurs. In this situation, the phase information alone becomes insufficient to determine the true extent of the timing offset. For example, if the actual phase shift is 370 degrees, the touch controller can only detect a 10-degree offset within its 0-359-degree range. This is because the phase measurement effectively "wraps around" after each complete rotation.

The limitation in phase detection beyond a single cycle highlights the importance of maintaining precise timing synchronization in system 100. To overcome this constraint, embodiments of this disclosure employ a timing offset and a phase shift correction. The phase shift correction enables much finer adjustments to the timing than the coarse correction provided by the timing offset, further refining the synchronization between the stylus-enabled device 102 and the stylus 104.

The two-step approach of coarse timing offset followed by fine phase shift adjustment allows the system to achieve and maintain highly accurate timing alignment, even in the presence of small variations or drift between the stylus and touch controller timing.

At step 512, the touch controller of the stylus-enabled device 102 applies the determined timing offset from step 508 and the determined phase shift from step 510 to adjust the synchronization timing at the timing generator circuit. The combined application of coarse and fine adjustments ensures that the stylus-enabled device 102 can receive the downlink signal correctly and maintain the same timing as the stylus 104, even when the stylus 104 may not consistently receive the uplink signal.

The process is repeated for each subsequent frame, allowing for continuous adjustment and maintenance of synchronization between the stylus-enabled device 102 and the stylus 104, thereby ensuring smooth and uninterrupted communication. The continuous adaptation allows system 100 to respond to changing environmental conditions, user behavior, and potential interference, maintaining optimal performance throughout the stylus usage session.

Figure 6:
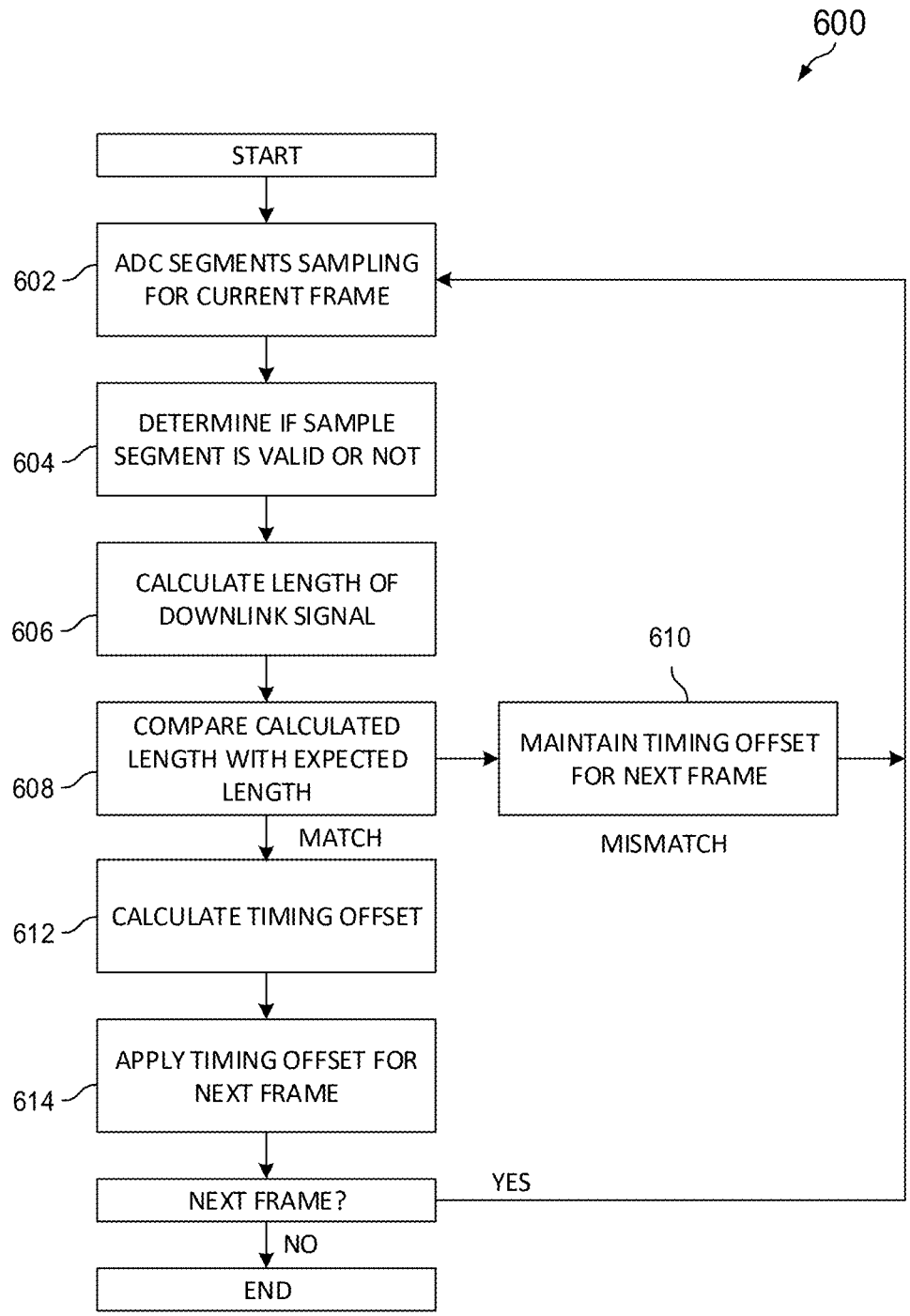
FIG. 6 is a flow chart of an embodiment method for determining a timing offset for the downlink signal to synchronize the stylus and the stylus-enabled device.

FIG. 6 illustrates a flow chart of an embodiment method 600 for determining a timing offset for the downlink signal to synchronize the stylus 104 and the stylus-enabled device 102. Method 600 can be implemented by the firmware of a touch controller of the stylus-enabled device 102, such as the touch controller 202 or touch controller 300. Method 600 can be employed to detect any timing offset within one cycle or greater than one cycle.

It is noted that all steps outlined in the flow chart of method 600 are not necessarily required and can be optional. Further, changes to the arrangement of the steps, removal of one or more steps and path connections, and addition of steps and path connections are similarly contemplated.

Method 600 starts at step 602, at a new frame, with an initial frame time ($T_{current}$). At step 602, the touch controller's analog-front-end circuit's ADC samples the incoming downlink signal and breaks it into N segments, where N is an integer greater than one. Segmenting the downlink signal into N segments allows for a more detailed analysis of the downlink signal over time. In embodiments, N is a configurable value. The accuracy of method 600 depends on the number of ADC sample segments (i.e., the sampling time for each ADC segment).

At step 604, the segmented digital signals are passed to an I/Q demodulator circuit in the analog-front-end circuit to extract the magnitude value of each sample segment. For each of the N number of ADC sample segments, the touch controller checks if the magnitude value of the sample segment exceeds a predetermined threshold. If the magnitude of the sample segment is above the threshold, it is marked as valid; otherwise, it's considered invalid. In embodiments, the predetermined threshold is used to distinguish between background noise and a valid signal from the stylus 104 for weak signals. In embodiments, the predetermined threshold is a configurable value.

The predetermined threshold is based on the magnitude output from the I/Q demodulator circuit (i.e., magnitude=$\sqrt{I^2+Q^2}$) and can be configurable. The predetermined threshold value is based on the magnitude output under normal noise conditions. In an embodiment, the predetermined threshold is around 150.

At step 606, using the validity information from all N number of ADC sample segments, the touch controller calculates the length of the downlink signal. The calculation can involve counting the number of consecutive, valid segments to determine the duration of the downlink signal.

At step 608, the calculated downlink length is compared to an expected or existing downlink length. If there's a mismatch, at step 610, the touch controller does nothing and maintains the current frame time T for the subsequent frame—the method 600 returns to step 602. However, if the lengths match, at step 612, the touch controller calculates the timing offset.

At step 612, the timing offset ($\Delta t_1$) is calculated as the difference between the time duration ($t_1$) and the time duration ($t_1'$), where time duration ($t_1$) corresponds to the difference between the end of the transmission of the uplink signal and the beginning of the sampling time for the first frame, and where time duration ($t_1'$) corresponds to the difference between the end of transmission of the uplink signal and the beginning of the receiving of the downlink signal for the first frame.

At step 614, once the timing offset ($\Delta t_1$) is determined for the first frame, it is applied as compensation to the frame time of the subsequent frame using, for example, the timing generator circuit of the analog-front-end circuit in the touch controller. The new frame time ($T_{NEW}$) is calculated as $T_{NEW}=T_{current}+\Delta t_1$, effectively adjusting the timing to better align with the incoming downlink signal.

The process repeats for the next frame, now using the new frame time ($T_{NEW}$). The iterative process allows the touch controller to continuously refine its synchronization with the stylus 104, adapting to any timing or signal characteristics changes over time. The fine-grained segmentation and timing offset calculation allows for highly accurate synchronization between the stylus-enabled device 102 and the stylus 104, even when the downlink signal is slightly delayed or advanced relative to the expected timing. The segmented ADC sampling and validity checking provide a robust way to detect the start and duration of the downlink signal accurately. At the same time, the frame-by-frame adjustment allows for dynamic adaptation to changing conditions.

Figure 7:
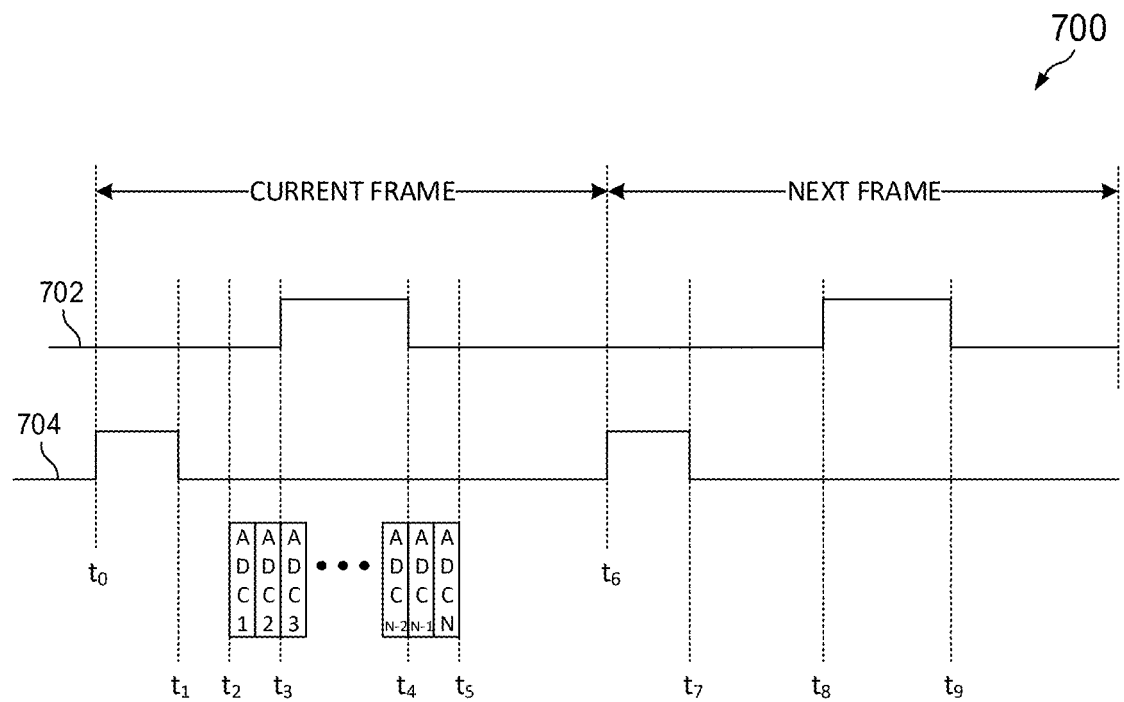
FIG. 7 is a simplified timing diagram based on the method of FIG. 6, showing an example relationship between the downlink signal from the stylus and the uplink signal from the stylus-enabled device, as well as the ADC sampling process and frame timing.

FIG. 7 illustrates a simplified timing diagram 700 based on method 600, showing an example relationship between the downlink signal 702 from the stylus and the uplink signal 704 from the stylus-enabled device, as well as the ADC sampling process and frame timing.

The current frame extends from time $t_0$ to $t_6$, with the next frame beginning at time $t_6$. The uplink signal 704 for the current frame is transmitted at $t_0$, while the uplink signal for the next frame starts at $t_6$. A first downlink signal 702 from the stylus is received from time $t_3$ to $t_4$ during the current frame. A second downlink signal 702 from the stylus is received from time to to $t_9$ during the next frame.

The timing offset ($\Delta t_1$) can be represented by the interval from $t_2$ to $t_3$. The timing offset ($\Delta t_1$) is calculated based on the difference between time duration ($t_1$) and the time duration ($t_1'$). The time duration ($t_1$) is measured from $t_2$ to $t_1$, representing the expected time between the end of the uplink transmission and the start of ADC sampling. The time duration ($t_1'$) is measured from $t_3$ to $t_1$, representing the actual time between the end of the uplink transmission and the beginning of the received downlink signal.

ADC sampling occurs from $t_2$ to $t_5$, divided into N segments. As shown, and as an exemplary embodiment, the initial two sampling periods from $t_2$ to $t_3$ and the final two from $t_4$ to $t_5$ do not detect a downlink signal. The valid downlink signal is detected between $t_3$ and $t_4$, where the ADC samples show magnitude values above the predetermined threshold. This period ($t_3$ to $t_4$) determines the detected length of the downlink signal.

To illustrate the timing offset calculation, consider the following example: The ADC sampling is split into 28 segments to determine timing offset and length. With a total sampling time of 2080 μs, each sample segment has a duration of approximately 74 μs (2080 μs/28 segments). When the first two segments do not receive a downlink signal from the start of the sampling time, the calculated timing offset ($\Delta t$) would be 148 μs (74 μs*2 segments). The $\Delta t$ is compensated in the subsequent frame. Given that the uplink duration is 217 μs and the time duration ($t_1$) is 823 μs, the touch controller can precisely adjust its timing to align with the stylus 104.

The compensation is applied to the next frame, where the new frame time ($T_{NEW}$) is set between $t_7$ and $t_8$. The adjustment ensures that the ADC sampling in the next frame is better aligned with the expected arrival of the downlink signal, improving the accuracy of signal detection and processing.

Accordingly, the exemplary timing diagram illustrates the dynamic nature of the synchronization process, showing how the touch controller can continuously adjust its timing based on the received downlink signal to maintain optimal communication with the stylus. The segmentation of the ADC sampling and the calculation of timing offsets allow for accurate synchronization, even in slight variations in signal timing or environmental conditions.

Figure 8:
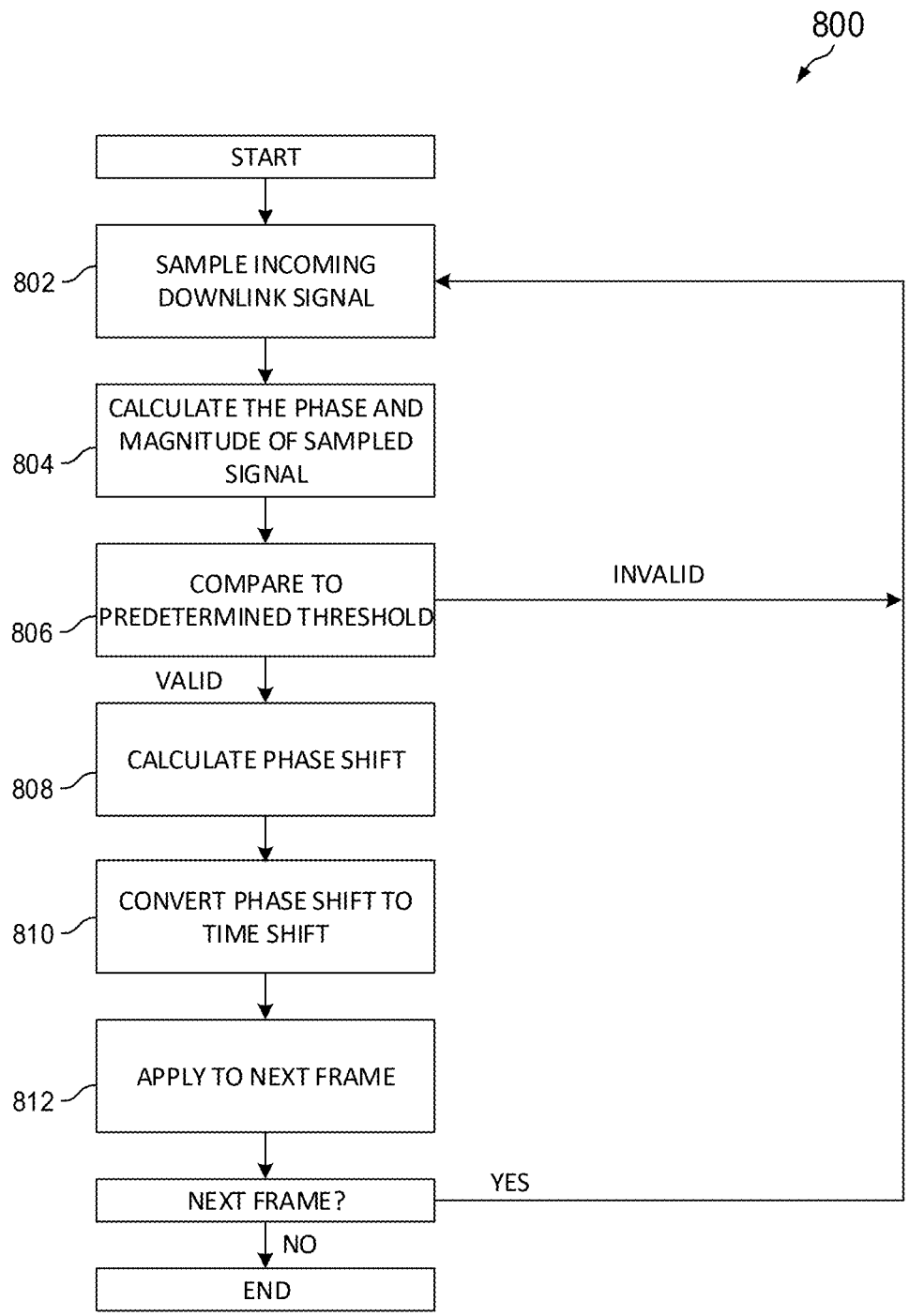
FIG. 8 is a flow chart of an embodiment method for determining a phase shift for the downlink signal to synchronize the stylus and the stylus-enabled device.

FIG. 8 illustrates a flow chart of an embodiment method 800 for determining a phase shift for the downlink signal to synchronize the stylus 104 and the stylus-enabled device 102. Method 800 can be implemented by the firmware of a touch controller of the stylus-enabled device 102, such as the touch controller 202 or touch controller 300.

It is noted that all steps outlined in the flow chart of method 800 are not necessarily required and can be optional. Further, changes to the arrangement of the steps, removal of one or more steps and path connections, and addition of steps and path connections are similarly contemplated.

Method 600 introduces a segmented approach to analog-to-digital conversion (ADC) operations. While this segmentation offers certain advantages, it also presents a challenge: the reduction in signal accumulation. The ADC's ability to accumulate the downlink signal is directly tied to its size. By dividing the ADC operation into smaller sampling segments, method 600 can inadvertently limit the overall accumulation capacity. The limitation can have a detrimental effect on the quality of the magnitude signal. The touch controller relies on the magnitude signal to accurately identify and track the stylus position on the touch surface. A high-quality magnitude signal ensures precise and responsive stylus detection, contributing to a smooth and accurate user experience.

However, in certain situations, the reduced accumulation resulting from method 600's segmented approach can lead to a degradation in the quality of the magnitude signal. The poor signal quality can manifest in various ways, such as increased noise, reduced sensitivity, or inconsistent stylus detection. These issues can impact the overall performance and reliability of the touch sensing system.

Method 800 provides an approach that addresses a potential limitation in method 600, where the segmentation size is set to maintain a good quality of the magnitude signal but is not granular enough to determine an extremely accurate offset. In method 800, the ADC sampling is not segmented, which provides a high enough accumulation size to have a good-quality magnitude signal for accurate position detection of the stylus by the touch controller.

At step 802, the touch controller's analog-front-end circuit's ADC samples the incoming downlink signal. Method 800 begins at the start of a new frame with an initial frame time. Typically, the initial frame time comes from the last new frame time ($T_{NEW}$) calculated from method 600. Thus, for the initial frame transition from method 600 to method 800, $T_{current}=T_{NEW}$.

At step 804, the digital signal is passed to an I/Q demodulator circuit in the analog-front-end circuit. Using the IQ demodulator circuit, the touch controller calculates the phase and magnitude of the sampled signal.

At step 806, the calculated magnitude of the sampled signal is compared to a predetermined threshold to ensure a good signal quality and correct detected phase. The predetermined threshold helps distinguish between a valid signal and background noise. If the calculated magnitude exceeds the predetermined threshold, the phase is considered valid, and the process continues to the phase shift calculation at step 808. If the magnitude is below the threshold, the phase is deemed invalid, and the phase shift is set to zero and the process returns to step 802 without any updates to the frame time. In embodiments, the predetermined threshold is a configurable value.

At step 808, for a valid phase, the phase shift can be calculated using the equation: PHASE SHIFT=PHASE−$PHASE_0$, where PHASE is the phase for the current frame and $PHASE_0$ is an ideal phase. The phase shift represents the timing difference between the expected and actual arrival of the downlink signal. In an ideal design, the downlink signal from the stylus 104 is synchronized such that the phase detected is zero. But in a real system, they are not synchronized due to clock difference between the stylus 104 and the stylus-enabled device 102. So, in every frame the phase is detected and delta phase can be calculated and the delta phase can be used for compensation.

At step 810, the phase shift calculated at step 808 is converted into a timing shift. This can be done by calculating the timing shift $\Delta t_2$ using the equation:

$$\Delta t_2 = \frac{\text{PHASE SHIFT}}{360} \times T_{DOWNLINK},$$

where PHASE SHIFT is the phase shift calculated at step 808, the value 360 represents a full duty cycle in degrees, and $T_{DOWNLINK}$ is the period of one complete downlink signal cycle. The conversion translates the angular phase difference into a time value that can be used to adjust the frame timing using, for example, the timing generator circuit of the analog-front-end circuit in the touch controller.

At step 812, the timing adjustment for the next frame is calculated by adding the determined timing shift ($\Delta t_2$) to the frame time ($T_{current}$). The frame time for the next cycle ($T_{NEW}$) is set to: $T_{NEW}=T_{current}+\Delta t_2$. In embodiments, method 600 and method 800 are proceeded in a sequential order. For example, after the ending of method 600, method 800 is proceeded with the method 600 result. Accordingly, in method 800, the first frame $T_{current}=T_{NEW}$ and $T_{current}$ is already applied by $\Delta t_2$. The phase shift is calculated to determine $\Delta t_2$.

In embodiments, step 614 of method 600 is performed in conjunction with step 812 of method 800. In such an embodiment, the frame time for the next cycle ($T_{NEW}$) is set to: $T_{NEW}=T_{current}+\Delta t_1+\Delta t_2$, where $\Delta t_1$ is the timing offset determined from method 600 and $\Delta t_2$ is the timing shift calculated from method 800.

The process repeats for the next frame, using the adjusted frame time ($T_{NEW}$). This method allows for precise synchronization between the stylus and the touch-enabled device. The initial coarse timing offset ($\Delta t_1$) aligns with the overall timing, while the phase-based fine adjustment ($\Delta t_2$) accounts for subtle variations within each cycle of the downlink signal. For example, if a phase shift of 90° is detected, it would result in a timing adjustment of one-quarter of the downlink signal's cycle length, allowing for accurate alignment of the sampling with the incoming signal.

Figure 9:
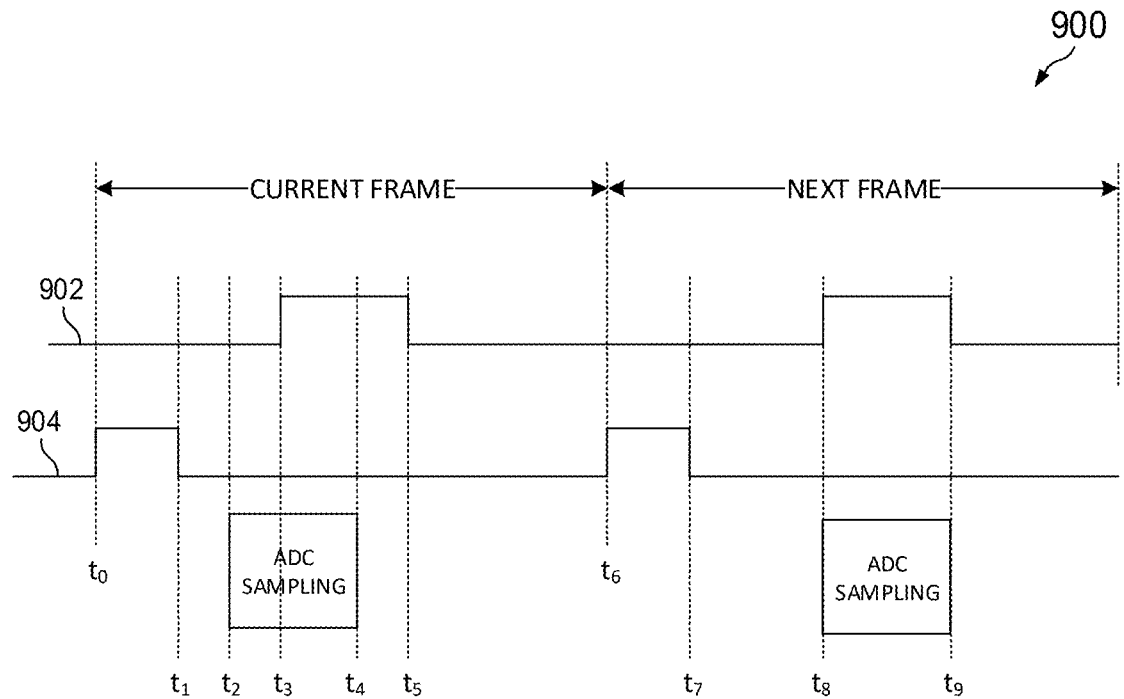
FIG. 9 is a simplified timing diagram based on the method of FIG. 8, an example relationship between the downlink signal from the stylus and the uplink signal from the stylus-enabled device, and the phase shift calculation process.

FIG. 9 illustrates a simplified timing diagram 900 based on method 800, an example relationship between the downlink signal 702 from the stylus and the uplink signal 704 from the stylus-enabled device, and the phase shift calculation process.

The current frame extends from time $t_0$ to $t_6$, with the next frame beginning at time $t_6$. The uplink signal 904 for the current frame is transmitted at $t_0$, while the uplink signal for the next frame starts at $t_6$. A first downlink signal 902 from the stylus is received from time $t_3$ to $t_4$ during the current frame. A second downlink signal 902 from the stylus is received from time $t_8$ to $t_9$ during the next frame.

The ADC sampling period for the current frame is shown between $t_2$ and $t_3$. During this period, the touch controller samples the incoming downlink signal and passes it to the I/Q demodulator of the touch controller for phase and magnitude calculation.

In the timing diagram 900, the initial reference phrase (PHASE$_0$) is set at time t$_3$, while the current phase is measured at time t$_2$. The phase shift is therefore calculated as the difference between these two time points: PHASE SHIFT=PHASE at t$_2$–PHASE$_0$ at t$_3$.

After calculating the PHASE SHIFT, it is converted into a timing shift (Δt$_2$) using the equation:

$$\Delta t_2 = \frac{\text{PHASE SHIFT}}{360} \times T_{DOWNLINK},$$

where T$_{DOWNLINK}$ is the period of one complete downlink signal cycle (i.e., from time t$_3$ to time t$_5$).

The timing adjustment for the next frame is calculated by adding the timing shift timing shift (Δt$_2$) to the frame time (T$_{current}$). In cases where method 600 is also applied, the new frame time would be calculated as T$_{NEW}$=T$_{current}$+Δt$_1$+Δt$_2$, where Δt$_1$ is the timing offset from method 600 and Δt$_2$ is the timing shift from method 800.

The effect of the timing adjustment can be seen in the next frame, where the ADC sampling period (shown between t$_8$ and t$_9$) is shifted to better align with the incoming downlink signal 902. The continuous adjustment process ensures that the touch controller maintains precise synchronization with the stylus, adapting to any subtle variations in timing from frame to frame.

Further, by combining the coarse timing offset adjustment from method 600 with the fine phase-based adjustment from method 800, system 100 can achieve a high degree of synchronization accuracy to maintain reliable communication between the stylus and the touch-enabled device, especially in environments where signal timing may vary due to external factors.

Figure 10:
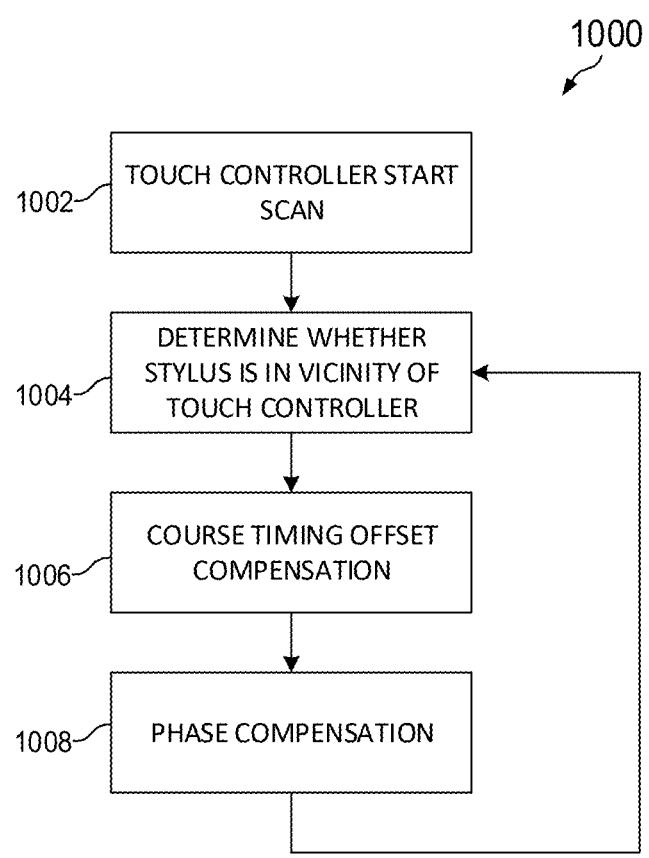
FIG. 10 is a flow chart of an embodiment method for synchronizing a stylus-enabled device with a stylus.

FIG. 10 illustrates a flow chart of an embodiment method 1000 for synchronizing a stylus-enabled device with a stylus, such as those shown in system 100. It is noted that all steps outlined in the flow chart of method 1000 are not necessarily required and can be optional. Further, changes to the arrangement of the steps, removal of one or more steps and path connections, and addition of steps and path connections are similarly contemplated.

Method 600, while providing initial synchronization between the stylus and the stylus-enabled device, can face a challenge in maintaining long-term synchronization. The challenge can arise from the inherent differences in the clock speeds of the two devices. Even though the first frame can be perfectly synchronized, the slight discrepancies in clock rates can lead to a gradual accumulation of timing shifts over subsequent frames.

As the frames progress, the minor timing differences between the stylus and the device can compound. The accumulation of timing shifts can eventually result in a loss of synchronization. The consequence can be a degradation in the accuracy and reliability of the stylus input over time, potentially leading to erratic behavior or loss of functionality. Method 800 introduces an approach to maintain synchronization through small timing adjustments to address this issue.

Accordingly, method 1000 operates on two levels: coarse adjustment and fine-tuning. The first level involves detecting significant timing shifts that may occur. When such a shift is identified, the system substantially adjusts the downlink signal and the touch controller back into rough synchronization.

Following the coarse adjustment, method 1000 employs a more nuanced approach for fine-tuning. This involves using phase detection techniques to compensate for smaller timing discrepancies. By continuously monitoring and adjusting for these minor phase shifts, the system can maintain a high degree of synchronization between the stylus and the device.

Method 800 allows for real-time, subtle corrections to the timing, ensuring that the accumulated drift does not reach a level that can significantly impact performance. The continuous fine-tuning process helps maintain the precision and responsiveness of the stylus input over extended periods of use.

By implementing the two-tiered approach, method 1000 effectively mitigates the synchronization issues that can be inherent in method 600. It provides a robust solution that can adapt to sudden, large timing shifts and the gradual drift due to clock discrepancies. This results in a more stable and reliable stylus input system that maintains accurate synchronization across numerous frames and extended usage sessions.

At step 1002, a touch controller of the stylus-enabled device initiates a scan. The touch controller activates a sensing mechanism to detect potential stylus activity nearby. The continuous scanning ensures the touch controller is ready to respond to stylus input.

At step 1004, the touch controller actively seeks to detect the presence of a stylus within its operational range. This involves analyzing incoming signals to identify any that match the expected characteristics of a stylus. In response to detecting the stylus, the process transitions to step 1006, conserving system resources when no stylus is detected.

At step 1006, the touch controller employs a coarse timing adjustment to synchronize the operations of the stylus-enabled device with the stylus. In embodiments, the coarse timing adjustment is based on method 600.

At step 1008, the touch controller employs a fine timing adjustment to synchronize the operations of the stylus-enabled device with the stylus. In embodiments, the fine timing adjustment is based on method 800. While step 1006 achieves rough synchronization, its accuracy can be limited by the length of the ADC sampling units. Step 1008 detects the phase difference between the stylus's downlink signal and the ADC sampling to refine the synchronization further.

The process can be executed and recalculated in every frame, with the calculated coarse and fine timing adjustments applied continuously. The ongoing adjustment continues as long as the stylus remains near the touchscreen of the stylus-enabled device, ensuring consistent, accurate synchronization.

Once the stylus leaves the vicinity of the touchscreen, the process returns to step 1004, ready to detect when the stylus comes close to the touchscreen again. The loop ensures the touch controller is always prepared to restart the detection and synchronization process whenever the stylus is reintroduced to the active area. The cyclic design allows for continuous, adaptive synchronization, accommodating the dynamic nature of stylus use where the tool may frequently move in and out of the touch-sensitive area.

A first aspect relates to a system for synchronizing a stylus-enabled device with a stylus, the stylus-enabled device comprising a touch controller configured to transmit an uplink signal to the stylus; receive a downlink signal from the stylus; determine a timing offset between the uplink signal and the downlink signal; determine a phase shift of the downlink signal; and adjust a synchronization timing based on the determined timing offset and the determined phase shift.

In a first implementation form of the system, according to the first aspect as such, the touch controller is further configured to sample the downlink signal using an analog-to-digital converter (ADC); segment the sampled downlink signal into a plurality of segments; and determine the timing offset based on the segmented downlink signal.

In a second implementation form of the system, according to the first aspect as such or any preceding implementation form of the first aspect, the touch controller is configured to determine a magnitude for each segment of the plurality of segments; compare the magnitude of each segment to a predetermined threshold; and identify valid segments based on the comparison.

In a third implementation form of the system, according to the first aspect as such or any preceding implementation form of the first aspect, the touch controller is configured to calculate a length of the downlink signal based on the identified valid segments; and determine the timing offset based on the calculated length of the downlink signal.

In a fourth implementation form of the system, according to the first aspect as such or any preceding implementation form of the first aspect, the touch controller comprises an In-phase and Quadrature (I/Q) demodulator configured to extract magnitude and phase information from the downlink signal.

In a fifth implementation form of the system, according to the first aspect as such or any preceding implementation form of the first aspect, the touch controller is configured to calculate the phase shift based on the extracted phase information; and convert the calculated phase shift into a timing shift.

In a sixth implementation form of the system, according to the first aspect as such or any preceding implementation form of the first aspect, the touch controller is configured to apply the determined timing offset as a coarse adjustment to the synchronization timing; and apply the determined phase shift as a fine adjustment to the synchronization timing.

A second aspect relates to a method for synchronizing a stylus-enabled device with a stylus, the method comprising transmitting, by a touch controller of the stylus-enabled device, an uplink signal to the stylus; receiving, by the touch controller, a downlink signal from the stylus; determining a timing offset between the uplink signal and the downlink signal; determining a phase shift of the downlink signal; and adjusting a synchronization timing based on the determined timing offset and the determined phase shift.

In a first implementation form of the method, according to the second aspect as such, the method further includes sampling the downlink signal using an analog-to-digital converter (ADC); segmenting the sampled downlink signal into a plurality of segments; and determining the timing offset based on the segmented downlink signal.

In a second implementation form of the method, according to the second aspect as such or any preceding implementation form of the second aspect, the method further includes determining a magnitude for each segment of the plurality of segments; comparing the magnitude of each segment to a predetermined threshold; and identifying valid segments based on the comparison.

In a third implementation form of the method, according to the second aspect as such or any preceding implementation form of the second aspect, the method further includes calculating a length of the downlink signal based on the identified valid segments; and determining the timing offset based on the calculated length of the downlink signal.

In a fourth implementation form of the method, according to the second aspect as such or any preceding implementation form of the second aspect, the method further includes extracting magnitude and phase information from the downlink signal using an In-phase and Quadrature (I/Q) demodulator.

In a fifth implementation form of the method, according to the second aspect as such or any preceding implementation form of the second aspect, the method further includes calculating the phase shift based on the extracted phase information; and converting the calculated phase shift into a timing shift.

In a sixth implementation form of the method, according to the second aspect as such or any preceding implementation form of the second aspect, the method further includes applying the determined timing offset as a coarse adjustment to the synchronization timing; and applying the determined phase shift as a fine adjustment to the synchronization timing.

A third aspect relates to a touch controller for synchronizing a synchronizing a stylus-enabled device with a stylus, the touch controller comprising an analog-to-digital converter (ADC) configured to sample a downlink signal received from the stylus; an In-phase and Quadrature (I/Q) demodulator configured to extract magnitude and phase information from the sampled downlink signal; a processor configured to determine a timing offset between an uplink signal transmitted to the stylus and the downlink signal, determine a phase shift of the downlink signal based on the extracted phase information, and adjust a synchronization timing based on the determined timing offset and the determined phase shift; and a timing generator circuit configured to apply the adjusted synchronization timing to subsequent communications with the stylus.

In a first implementation form of the touch controller, according to the third aspect as such, the processor is further configured to segment the sampled downlink signal into a plurality of segments; determine a magnitude for each segment of the plurality of segments; compare the magnitude of each segment to a predetermined threshold; and identify valid segments based on the comparison.

In a second implementation form of the touch controller, according to the third aspect as such or any preceding implementation form of the third aspect, the processor is configured to calculate a length of the downlink signal based on the identified valid segments; and determine the timing offset based on the calculated length of the downlink signal.

In a third implementation form of the touch controller, according to the third aspect as such or any preceding implementation form of the third aspect, the processor is configured to calculate the phase shift based on the extracted phase information; and convert the calculated phase shift into a timing shift.

In a fourth implementation form of the touch controller, according to the third aspect as such or any preceding implementation form of the third aspect, the processor is configured to apply the determined timing offset as a coarse adjustment to the synchronization timing; and apply the determined phase shift as a fine adjustment to the synchronization timing.

In a fifth implementation form of the touch controller, according to the third aspect as such or any preceding implementation form of the third aspect, the touch controller further comprises a modulating circuit configured to generate the uplink signal for transmission to the stylus, wherein the uplink signal is used as a reference for determining the timing offset.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A system for synchronizing a stylus-enabled device with a stylus, the stylus-enabled device comprising a touch controller configured to:
   transmit an uplink signal to the stylus;
   receive a downlink signal from the stylus;
   determine a timing offset between the uplink signal and the downlink signal;
   determine a phase shift of the downlink signal; and
   adjust a synchronization timing based on the determined timing offset and the determined phase shift.

2. The system of claim 1, wherein the touch controller is further configured to:
   sample the downlink signal using an analog-to-digital converter (ADC);
   segment the sampled downlink signal into a plurality of segments; and
   determine the timing offset based on the segmented downlink signal.

3. The system of claim 2, wherein the touch controller is configured to:
   determine a magnitude for each segment of the plurality of segments;
   compare the magnitude of each segment to a predetermined threshold; and
   identify valid segments based on the comparison.

4. The system of claim 3, wherein the touch controller is configured to:
   calculate a length of the downlink signal based on the identified valid segments; and
   determine the timing offset based on the calculated length of the downlink signal.

5. The system of claim 1, wherein the touch controller comprises an In-phase and Quadrature (I/Q) demodulator configured to extract magnitude and phase information from the downlink signal.

6. The system of claim 5, wherein the touch controller is configured to:
   calculate the phase shift based on the extracted phase information; and
   convert the calculated phase shift into a timing shift.

7. The system of claim 1, wherein the touch controller is configured to:
   apply the determined timing offset as a coarse adjustment to the synchronization timing; and
   apply the determined phase shift as a fine adjustment to the synchronization timing.

8. A method for synchronizing a stylus-enabled device with a stylus, the method comprising:
   transmitting, by a touch controller of the stylus-enabled device, an uplink signal to the stylus;
   receiving, by the touch controller, a downlink signal from the stylus;
   determining a timing offset between the uplink signal and the downlink signal;
   determining a phase shift of the downlink signal; and
   adjusting a synchronization timing based on the determined timing offset and the determined phase shift.

9. The method of claim 8, further comprising:
   sampling the downlink signal using an analog-to-digital converter (ADC);
   segmenting the sampled downlink signal into a plurality of segments; and
   determining the timing offset based on the segmented downlink signal.

10. The method of claim 9, further comprising:
    determining a magnitude for each segment of the plurality of segments;
    comparing the magnitude of each segment to a predetermined threshold; and
    identifying valid segments based on the comparison.

11. The method of claim 10, further comprising:
    calculating a length of the downlink signal based on the identified valid segments; and
    determining the timing offset based on the calculated length of the downlink signal.

12. The method of claim 8, further comprising extracting magnitude and phase information from the downlink signal using an In-phase and Quadrature (I/Q) demodulator.

13. The method of claim 12, further comprising:
    calculating the phase shift based on the extracted phase information; and
    converting the calculated phase shift into a timing shift.

14. The method of claim 8, further comprising:
    applying the determined timing offset as a coarse adjustment to the synchronization timing; and
    applying the determined phase shift as a fine adjustment to the synchronization timing.

15. A touch controller for synchronizing a synchronizing a stylus-enabled device with a stylus, the touch controller comprising:
    an analog-to-digital converter (ADC) configured to sample a downlink signal received from the stylus;
    an In-phase and Quadrature (I/Q) demodulator configured to extract magnitude and phase information from the sampled downlink signal;
    a processor configured to:
      determine a timing offset between an uplink signal transmitted to the stylus and the downlink signal,
      determine a phase shift of the downlink signal based on the extracted phase information, and
      adjust a synchronization timing based on the determined timing offset and the determined phase shift; and
    a timing generator circuit configured to apply the adjusted synchronization timing to subsequent communications with the stylus.

16. The touch controller of claim 15, wherein the processor is further configured to:
    segment the sampled downlink signal into a plurality of segments;

determine a magnitude for each segment of the plurality of segments;

compare the magnitude of each segment to a predetermined threshold; and identify valid segments based on the comparison.

17. The touch controller of claim 16, wherein the processor is configured to:

calculate a length of the downlink signal based on the identified valid segments; and determine the timing offset based on the calculated length of the downlink signal.

18. The touch controller of claim 15, wherein the processor is configured to:

calculate the phase shift based on the extracted phase information; and convert the calculated phase shift into a timing shift.

19. The touch controller of claim 15, wherein the processor is configured to:

apply the determined timing offset as a coarse adjustment to the synchronization timing; and apply the determined phase shift as a fine adjustment to the synchronization timing.

20. The touch controller of claim 15, further comprising a modulating circuit configured to generate the uplink signal for transmission to the stylus, wherein the uplink signal is used as a reference for determining the timing offset.

* * * * *